US010705776B2

(12) United States Patent
Mihira

(10) Patent No.: US 10,705,776 B2
(45) Date of Patent: Jul. 7, 2020

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/148,714

(22) Filed: Oct. 1, 2018

(65) Prior Publication Data

US 2019/0107979 A1 Apr. 11, 2019

(30) Foreign Application Priority Data

Oct. 10, 2017 (JP) .................................. 2017-197251

(51) Int. Cl.
| | | |
|---|---|---|
| G06F 3/12 | (2006.01) | |
| H04W 12/06 | (2009.01) | |
| H04L 29/08 | (2006.01) | |
| H04L 29/06 | (2006.01) | |
| H04W 84/12 | (2009.01) | |

(52) U.S. Cl.
CPC .......... *G06F 3/1236* (2013.01); *G06F 3/1222* (2013.01); *G06F 3/1286* (2013.01); *G06F 3/1287* (2013.01); *H04L 63/00* (2013.01); *H04L 63/08* (2013.01); *H04L 67/02* (2013.01); *H04L 67/28* (2013.01); *H04W 12/06* (2013.01); *H04L 63/168* (2013.01); *H04W 84/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0172723 | A1* | 8/2006 | Ishikawa | H04W 12/04031 455/411 |
| 2012/0066750 | A1* | 3/2012 | McDorman | H04L 9/3234 726/7 |
| 2018/0054469 | A1* | 2/2018 | Simoncelli | H04L 12/4641 |
| 2018/0069878 | A1* | 3/2018 | Martini | H04L 61/1511 |
| 2018/0335524 | A1* | 11/2018 | Youssef | G01S 19/10 |
| 2018/0357021 | A1* | 12/2018 | Minami | G06F 3/1204 |
| 2019/0082058 | A1* | 3/2019 | Aoki | H04N 1/00037 |

FOREIGN PATENT DOCUMENTS

| | | |
|---|---|---|
| CN | 1835468 A | 9/2006 |
| CN | 101241500 A | 8/2008 |
| CN | 101345741 A | 1/2009 |
| CN | 101931635 A | 12/2010 |

(Continued)

*Primary Examiner* — Helen Zong
(74) *Attorney, Agent, or Firm* — Canon U.S.A., Inc. I.P. Division

(57) ABSTRACT

An image processing apparatus includes a setting unit and a communication control unit to execute HTTP communication to an external apparatus. The setting unit sets whether to use a proxy server. The communication control unit controls, in a case where Hypertext Transfer Protocol (HTTP) communication to the external apparatus on a personal area network is performed, executing the HTTP communication to the external apparatus by other than the proxy server, even if use of the proxy server is set.

12 Claims, 6 Drawing Sheets

(56) References Cited

FOREIGN PATENT DOCUMENTS

| | | |
|---|---|---|
| CN | 102143187 A | 8/2011 |
| CN | 103414639 A | 11/2013 |
| CN | 103533001 A | 1/2014 |
| CN | 103634359 A | 3/2014 |
| JP | 2013157941 A | 8/2013 |
| JP | 2013-176031 A | 9/2013 |

\* cited by examiner

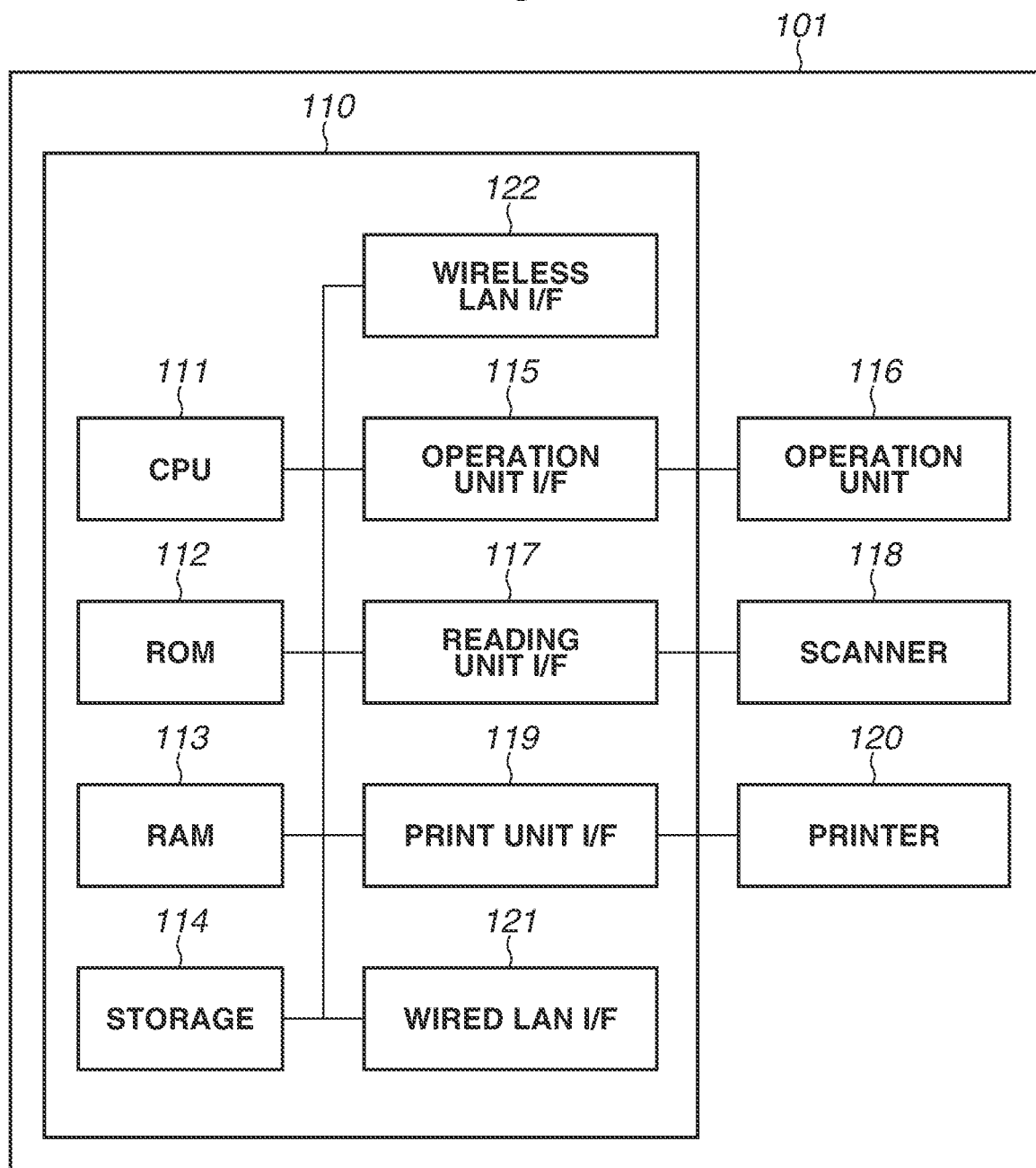

FIG.3

| SETTING ITEM | | | SETTING CONTENT |
|---|---|---|---|
| NETWORK SETTINGS | | | |
| 301 | WIRED LAN SETTING | | OFF/ON, CONNECTION INFORMATION (INCLUDING IP ADDRESS, SUBNET MASK, AND GW ADDRESS) |
| | WIRELESS LAN SETTING | | OFF/ON, CONNECTION INFORMATION (INCLUDING SSID AND AUTHENTICATION KEY) |
| | DIRECT WIRELESS COMMUNICATION | | |
| | | 302 — USE DIRECT WIRELESS COMMUNICATION | PROHIBITION/PERMISSION |
| | | 303 — IP ADDRESS SETTING | IP ADDRESS, RANGE OF IP ADDRESSES ASSIGNED TO EXTERNAL TERMINALS |
| 304 | PROXY SETTING | | |
| | | 305 — USE PROXY SERVER | OFF/ON |
| | | 306 — SERVER ADDRESS | ADDRESS OF PROXY SERVER TO BE USED (IP ADDRESS OR HOST NAME) |
| | | AUTHENTICATION SETTING | ON/OFF, PASSWORD TO BE USED IN PROXY AUTHENTICATION |

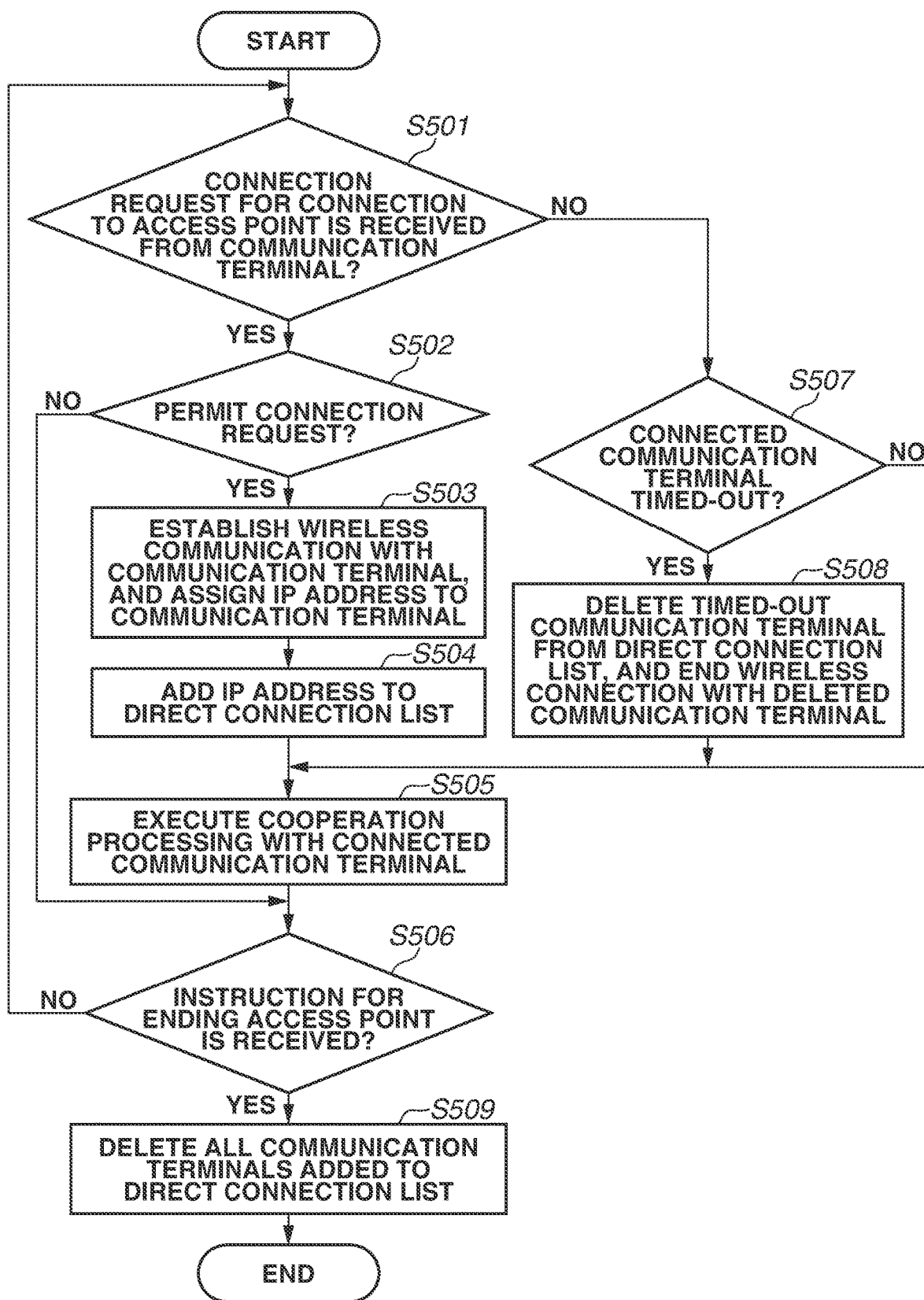

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present disclosure relates to an image processing apparatus having a wireless communication function.

Description of the Related Art

An increasing number of image processing apparatuses, such as multifunctional peripherals, are equipped with wireless local area network (LAN) functions. There is also an image processing apparatus that can transmit and receive information to and from a communication terminal, by establishing wireless connection with the communication terminal without the intervention of a relay apparatus (referred to as direct wireless communication). Japanese Patent Application Laid-Open No. 2013-157941 discusses an image processing apparatus that transmits and receives data to and from an external communication terminal, by establishing wireless connection conforming to Wi-Fi Direct® standard with a mobile terminal and using the established wireless connection. The image processing apparatus of Japanese Patent Application Laid-Open No. 2013-157941 can also transmit and receive data to and from a communication terminal on a LAN, by connecting to an external access point (AP) serving as a wireless client conforming to the Institute of Electrical and Electronics Engineers (IEEE) 802.11.

In many cases, an image processing apparatus, such as a multifunctional peripheral, is installed in an organization, for example. In an organization including a company, there is a case where network operation is managed via a proxy server, for Hypertext Transfer Protocol (HTTP) communication to the Internet that is outside the organization, for the purpose of improving information security.

In view of this situation, whether to use a proxy server can be set in an image processing apparatus of recent years, such as a multifunctional peripheral, to allow the image processing apparatus to perform the HTTP communication with an apparatus on the Internet even in an environment where the network operation is managed as described above.

In addition, in recent years, to facilitate use of an image processing apparatus from a communication terminal, a cooperation application for cooperation between a communication terminal and the image processing apparatus has appeared. The communication terminal installed with such a cooperation application can cooperate with an information processing apparatus, such as a multifunctional peripheral, by using the above-described direct wireless communication. The cooperation application has a plurality of cooperation functions including a print function for transmitting print data to the image processing apparatus, and a scan function for saving data obtained by scanning an original in the image processing apparatus into the communication terminal.

In this way, an image processing apparatus of recent years has two communication paths; one for communication to a network within a company, and the other for the direct wireless communication.

Further, in a case where the HTTP communication is performed from an image processing apparatus in which use of a proxy server is set, a HTTP request is transmitted to the set proxy server, and the HTTP communication is performed via this proxy server. In an image processing apparatus, such as a multifunctional peripheral, whether to use a proxy server is set as an overall setting for a network. Consequently, when the HTTP communication to a communication apparatus communicating with the image processing apparatus in the direct wireless communication is attempted, the above-described HTTP request may be transmitted via the proxy server. In this case, the following issue can arise: the proxy server cannot find a partner communication apparatus and thus fails to perform the HTTP communication with a communication terminal.

SUMMARY OF THE INVENTION

The present disclosure is directed to providing a mechanism for performing HTTP communication to a partner on a personal area network not via a proxy server, even if use of the proxy server is set.

According to an aspect of the present disclosure, an image processing apparatus to execute HTTP communication to an external apparatus includes a setting unit configured to set whether to use a proxy server, and a communication control unit configured to control, in a case where Hypertext Transfer Protocol (HTTP) communication to the external apparatus on a personal area network is performed, executing the HTTP communication to the external apparatus by other than the proxy server, even if use of the proxy server is set.

Further features of the present invention will become apparent from the following description of embodiments with reference to the attached drawings.

BRIEF DESCRIPTION OF THE DRAWINGS

FIG. 2 is a diagram illustrating a hardware configuration of a multifunctional peripheral (MFP).

FIG. 3 is a diagram illustrating network settings of the MFP.

FIG. 5 is a flowchart illustrating control of the MFP.

DESCRIPTION OF THE EMBODIMENTS

Embodiments be described in detail below with reference to the drawings. The embodiments to be described below are not intended to limit the disclosure according to the scope of claims, and not all combinations of features to be described in the embodiments are necessary for a solution to the disclosure.

Figure 1:
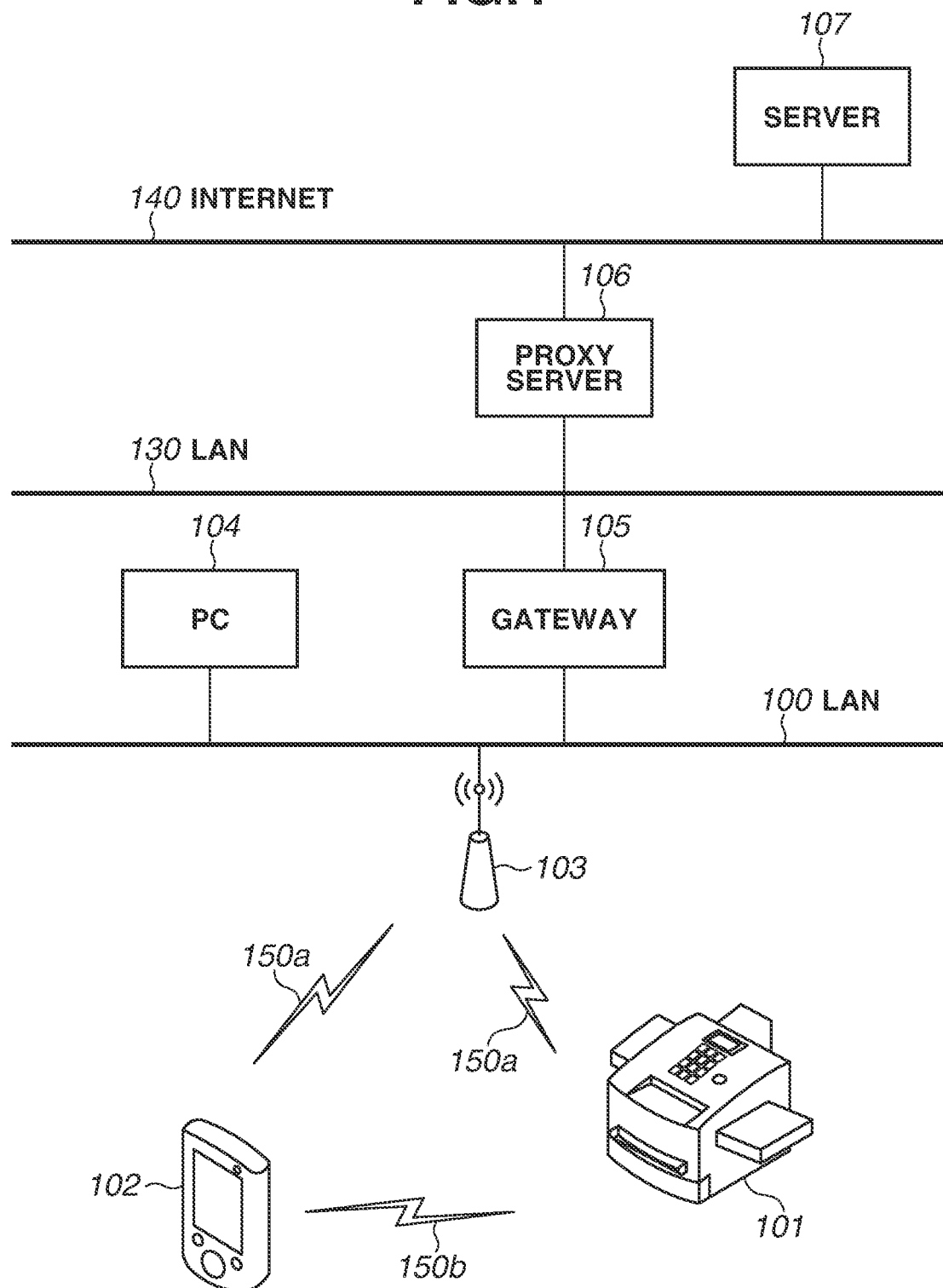
FIG. 1 is a diagram illustrating an outline of a system.

A configuration of a communication system according to an embodiment will be described with reference to FIG. 1. The communication system according to the present embodiment includes a communication terminal 102, a multifunctional peripheral (MFP) 101, and an access point (AP) 103. The communication system according to the present embodiment further includes a communication terminal, such as a personal computer (PC) 104, installed within a local area network (LAN) 100, a gateway 105 serving as a firewall, a proxy server 106, and a server 107 on the Internet.

First, apparatuses within the LAN 100 will be described. The Institute of Electrical and Electronics Engineers (IEEE) 802.11 standard (hereinafter referred to as the IEEE 802.11 or the IEEE 802.11 standard) includes transmission medium flow control and multiplexing specifications as well as physical layer specifications to implement computer network communication in predetermined frequency bands without connecting wires. The communication terminal 102 can execute wireless communication based on the IEEE 802.11. The communication terminal 102 can connect to a wireless network 150a provided by the AP 103. The AP 103 is connected to the LAN 100. The AP 103 interconnects the wireless network 150a and the LAN 100 that is a wired network, by converting an IEEE 802.11 frame and an Ethernet frame to and from each other, and transmitting the result. A communication terminal connected to the AP 103 can communicate with an apparatus, such as a communication terminal, connected to the LAN 100 and a server on the Internet 140.

The MFP 101 is an image processing apparatus having a print function of receiving print data via a network and printing the received print data, and a transmission function of transmitting data obtained by scanning to a communication terminal on a network. When wireless network settings for connection to the AP 103 are set, the MFP 101 can communicate with an external apparatus connected to the wireless network 150a, the LAN 100, or the Internet 140, via the AP 103. In the present embodiment, a case where the MFP 101 is connected to the LAN 100 via the AP 103 is used as an example, but this is not limitative. For example, the MFP 101 can be connected to the LAN 100 by using a network cable. The MFP 101 can transmit data such as scan data, to apparatuses, such as the PC 104 on the LAN 100 and the server 107 on the Internet 140. For example, File Transfer Protocol (FTP), Web-based Distributed Authoring and Versioning (WebDAV), and e-mail can be used for the data transmission.

The MFP 101 can also operate in an access point mode. In a case where the MFP 101 operates in the access point mode, the MFP 101 operates as a software access point and provides a wireless network 150b. The wireless network 150b is a wireless personal area network (WPAN) used for communication with a peripheral communication terminal (e.g., the communication terminal 102), and is not interconnected with the LAN 100 and the Internet 140.

In the case where the MFP 101 operates in the access point mode, the communication terminal 102 can join the wireless network 150b by connecting to a software AP provided by the MFP 101. The communication terminal 102 connected to the software AP provided by the MFP 101 can execute wireless communication directly with the MFP 101 without the intervention of a relay apparatus, such as the AP 103. In the present embodiment, a form in which a communication terminal executes wireless communication directly with the MFP 101 without the intervention of a relay apparatus, such as the AP 103, is hereinafter referred to as the direct wireless communication.

The communication terminal 102 can communicate with the MFP 101 by using the direct wireless communication. Further, a cooperation application for performing printing and scanning in cooperation with the MFP 101 is installed in the communication terminal 102. The cooperation application has a plurality of cooperation functions including a print function for transmitting print data to the MFP 101, and a scan function for saving data obtained by scanning an original in the MFP 101 into the communication terminal 102.

Hypertext Transfer Protocol (HTTP) provides information system application rules concerning formatting data communication, such as through structure text, and transmitting data between nodes using logical link and HTTP commands. When a user provides an instruction for executing the scan function from an operation screen for the cooperation application, the communication terminal 102 activates a WebDAV server. The MFP 101 uploads data obtained by scanning an original to the WebDAV server activated by the communication terminal 102, whereby the data is transferred to the communication terminal 102. The WebDAV allows browser users to perform operations to author remote World Wide Web content by, for example, creating, and moving content on a remote server. The WebDAV is a protocol formed by expanding, HTTP, and adopts a communication scheme similar to that of the HTTP, for data communication between terminals. Therefore, in a case where the scan function is used from the cooperation application, HTTP communication is performed from the MFP 101 to the communication terminal 102.

In the present embodiment, a smartphone or a tablet type PC is used as an example of the communication terminal, but this is not limitative. The smartphone or the tablet type PC is used as an example of the communication terminal capable of executing wireless communication, and other types of communication terminal such as a laptop PC and a wearable terminal may be adopted.

Further, in the present embodiment, the MFP 101 that is a multifunctional apparatus is used as an example of the image processing apparatus, but this is not limitative. For example, a single function peripheral (SPF), such as a scanner apparatus, may be adopted. Furthermore, the present embodiment is applicable to various other types of image processing apparatus having two communication paths; one for communication to a network within an organization and the other for the direct wireless communication. The present embodiment is also applicable to, for example, digital signage for displaying information or an advertisement as illuminant advertising media, a contents distribution terminal, a bulletin board, and a 3D printer. In this case, the image processing apparatus, such as the digital signage, the contents distribution terminal, the bulletin board, or the 3D printer, is controlled to be capable of performing the HTTP communication not via a proxy server, when performing the HTTP communication to a communication terminal connected in the direct wireless communication. The HTTP communication may be performed by other than a proxy Server.

Next, communication from the LAN 100 to the Internet 140 will be described. The gateway 105 is connected to the LAN 100 that is a private network within an organization, such as a company, and to a LAN 130 provided as a demilitarized zone (DMZ). The gateway 105 serves as a firewall.

The proxy server 106 installed between the LAN 130 and the Internet 140 is a server for relaying the HTTP communication, in a case where access from the LAN 100 to a web server on the Internet 140 is made. The proxy server 106 is provided in view of security including management of an access log and prevention of direct access from outside.

Therefore, in the communication system according to the present embodiment, in a case where the HTTP communication is performed from a terminal connected to the LAN 100 to a web server on the Internet 140 or the WebDAV server, the communication is performed via the proxy server 106. If use of a proxy server is set in the MFP 101, the HTTP communication can be performed via the proxy server 106.

<MFP>

Next, the MFP 101 will be described with reference to FIG. 2. FIG. 2 is a block diagram illustrating a hardware configuration of the MFP 101. The MFP 101 has a reading function of reading an image, and a print function of printing an image on a sheet.

A control unit 110 includes a central processing unit (CPU) 111, and controls operation of the entire MFP 101. The CPU 111 reads out a control program stored in a read only memory (ROM) 112 or a storage 114 to perform various kinds of control such as print control and reading control. The ROM 112 stores a control program executable by the CPU 111. A random access memory (RAM) 113 is a main memory of the CPU 111, and used as a work area or a temporary storage area for loading commands of various control programs. The storage 114 stores print data, image data, various programs, and various kinds of setting information. For example, the storage 114 may store setting information about scan received from an external communication terminal on the WPAN.

In the MFP 101 of the present embodiment, a single CPU, i.e., the CPU 111, executes each process in a flowchart to be described below, by using one memory (the RAM 113). However, other mode may be adopted. For example, each process in the flowchart to be described below can be executed by allowing a plurality of processors, random-access memories (RAMs), read-only memories (ROMs), and storages to collaborate with each other. A part of the processing can be implemented by hardware such as an application specific integrated circuit (ASIC) and a field-programmable gate array (FPGA).

An operation unit interface (I/F) 115 connects an operation unit 116 and the control unit 110. The operation unit 116 includes a liquid crystal display unit having a touch panel function and various hardware keys. The operation unit 116 functions as a display unit for displaying information and a receiving unit for receiving an instruction from a user.

A reading unit I/F 117 connects a scanner 118 and the control unit 110. The scanner 118 may optically scans images, printed text, handwriting or an object and converts the scan to a digital image. The scanner 118 generates a read image by reading an original. The generated read image is transmitted to an external apparatus or used for printing.

A print unit I/F 119 connects a printer 120 and the control unit 110. The printer 120 prints an image on a sheet based on print data received from outside.

The control unit 110 can connect to a network such as the LAN 100 via a wired LAN I/F 121.

The control unit 110 further includes a wireless LAN I/F 122. The wireless LAN I/F 122 is an interface for performing wireless communication conforming to the IEEE 802.11. The CPU 111 collaborates with the wireless LAN I/F 122 to provide a wireless client function for performing wireless communication by connecting to an external AP, and a software AP function to allow the MFP 101 to act as an AP conforming to the IEEE 802.11.

When connection information (a service set identifier (SSID) and a security key) for connection to the AP 103 is set as wireless network settings of the MFP 101, the MFP 101 can perform wireless communication via the AP 103.

The software AP is activated in a case where the access point mode is ON. In a case where the access point mode is set to ON by a user, the CPU 111 collaborates with the wireless LAN I/F 122 to act as the software AP to which an external apparatus is connectable. The SSID and the security key for connection to the software AP are displayed by the operation unit 116 of the MFP 101, according to a user operation. The MFP 101 of the present embodiment can activate one software AP, but this is not limitative. Further, the MFP 101 of the present embodiment can simultaneously operate the wireless client function and the software AP function (simultaneous operation is possible). In other words, although a physical wireless network interface is one, two I/Fs are provided as logical network interfaces, which are an I/F for use as a software AP and an I/F for connecting to an external AP as a wireless client.

Next, the network settings of the MFP 101 will be described with reference to FIG. 3. Settings about a network can be set by a user, as an item of setting for controlling the operation of the MFP 101. FIG. 3 is a diagram illustrating the network settings, specifically, illustrating an item of the setting for controlling the operation of the MFP 101. The user such as an administrator can change each setting illustrated in FIG. 3 via a setting screen displayed by the operation unit 116 of the MFP 101. These network settings are stored in a nonvolatile storage area, such as the storage 114, and appropriately referred to, for example, in control in the flowchart to be described below.

As illustrated in FIG. 3, an item in which settings can be changed in the MFP 101 includes ON or OFF of each communication interface and a setting of connection information of each communication interface. In the present embodiment, the description will be given of the case in which, for example, the wireless LAN I/F 122 is set to ON, and the connection information (including a SSID, a security key, and an internet protocol (IP) address assigned to the MFP 101) for connection to the AP 103 is set.

The user, such as the administrator, can change settings about the direct wireless communication and settings about the proxy server described above. Settings 301 indicate the settings about the direct wireless communication. Specifically, the settings 301 include a setting 302 about whether to permit the direct wireless communication and a setting 303 about an IP address in a case where the direct wireless communication is used. For the setting 303, it is possible to set, for example, an IP address to be assigned to the MFP 101, and a range of IP addresses to be distributed to wireless clients to be connected to the software AP. In the present embodiment, permission of the direct wireless communication is set for the purpose of description. In addition, 192.168.22.1/24 is set as the IP address to be assigned to the MFP 101 and a range of 192.168.22.2 to 192.168.22.10 is set as the range of IP addresses to be distributed.

Settings 304 indicate settings about the proxy server. Specifically, the settings 304 include a setting 305 about whether to use a proxy server and settings 306 for performing communication with the proxy server. The settings 306 include the address of the proxy server to be used. In addition, for example, whether to use an authentication function of the proxy server and a password to be used for authentication can be set as appropriate.

In the present embodiment, the description will be given of the case in which use of the proxy server is set and the IP address or host name of the proxy server 106 is set as the address of the server. Therefore, a HTTP request is to be transmitted from the MFP 101 via the proxy server 106.

Meanwhile, as described with reference to FIG. 1 and FIG. 2, the MFP 101 has two communication paths; one for communication to be performed via the LAN 100, and the other for communication to be performed via the wireless network 150*b* provided by the software AP provided by the MFP 101 itself.

Here, in a case where use of the proxy server 106 is set in the MFP 101, if the HTTP communication is performed from the MFP 101, a HTTP request is transmitted to the proxy server 106, and the HTTP communication is performed via the proxy server 106. Consequently, in a case where an attempt is made to perform the HTTP communication to a communication apparatus (e.g., the communication terminal 102) performing the direct wireless communication with the MFP 101 via the wireless network 150b, the above-described HTTP request may be transmitted via the proxy server 106. In this case, the proxy server 106 cannot find a partner communication apparatus and thus fails to perform the HTTP communication with the communication terminal 102.

In the present embodiment, in view of such an issue, control is performed such that, even if use of a proxy server is set, the HTTP communication can be performed not via the proxy server, for a partner communicating in the direct wireless communication.

Figure 4A:
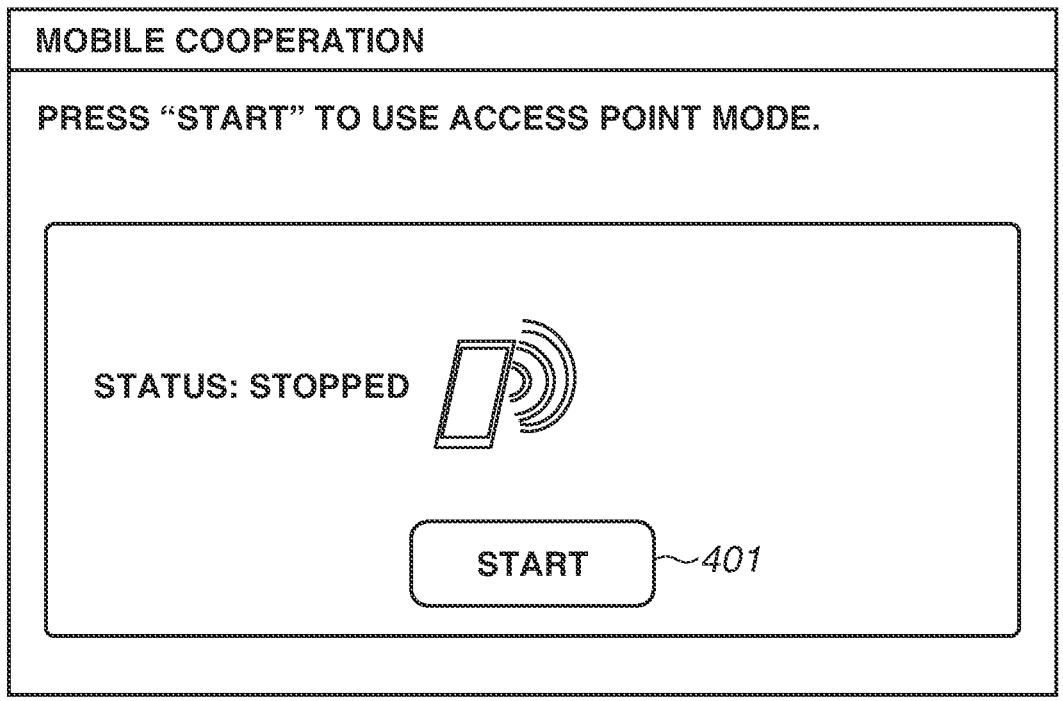
FIGS. 4A and 4B are diagrams each illustrating a screen to be displayed by an operation unit of the MFP.
Figure 4B:
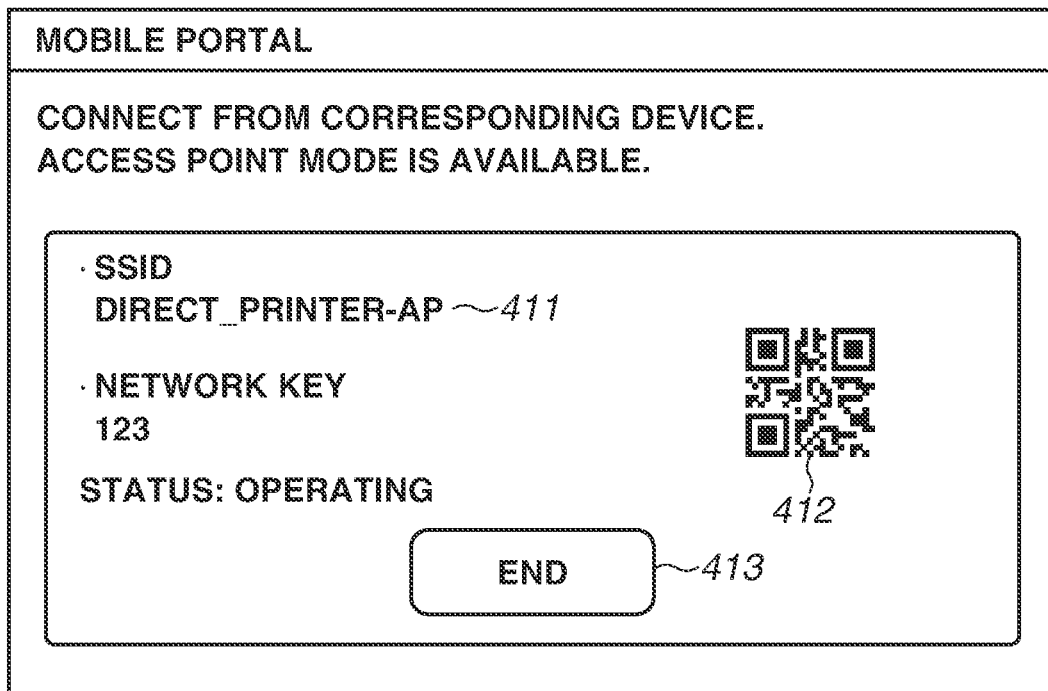

First, activation and ending of the software AP providing the wireless network 150b will be described with reference to FIGS. 4A and 4B. FIGS. 4A and 4B are diagrams each illustrating an example of a screen displayed by the operation unit 116 of the MFP 101.

A user using the MFP 101 can use each function of the MFP 101, by selecting a key (a display item) for using a function, such as a copy function or the scan function, of the MFP 101 via a main menu screen displayed by the operation unit 116. The main menu provides a mobile cooperation key to be used for cooperation with the communication terminal 102, such as a smartphone or a tablet terminal. The MFP 101 allows transition of the screen displayed by the operation unit 116 to a mobile portal screen illustrated in each of FIGS. 4A and 4B, according to selection of the mobile cooperation key by the user.

FIGS. 4A and 4B are diagrams each illustrating an example of the screen displayed by the operation unit 116 of the MFP 101. Specifically, FIGS. 4A and 4B each illustrate an example of the mobile portal screen.

Via the mobile portal screen, the user can check information when the communication terminal 102 connects to the MFP 101, and can switch between activation and ending of the software AP.

A start key 401 in FIG. 4A is a key to be used to activate the software AP to be used in the direct wireless communication. Based on selection of the start key 401 by the user, the CPU 111 changes the screen displayed by the operation unit 116 to the screen in FIG. 4B.

Further, the CPU 111 sets the access point mode to ON, and activates the software AP for the direct wireless communication by controlling the wireless LAN I/F 122.

In the present embodiment, the software AP is to be activated using such settings that a SSID for distinguishing an access point is "DIRECT_PRINTER-AP" and a network key is "123" when the software AP is activated.

The screen in FIG. 4B displays information 411 as the connection inform for connection to the software AP of the MFP 101. The screen in FIG. 4B displays a QR Code® 412 including the connection information, such as the SSID and the network key. An end key 413 is a key to be used in stopping the software AP. Based on selection of the end key 413 by the user, the MFP 101 stops the activated software AP.

The cooperation application installed in the communication terminal 102 reads the QR code 412 by using a camera (not illustrated) of the communication terminal 102 to acquire the connection information. The QR code 412 includes the connection information for connection to the software AP of the MFP 101 and the IP address of the MFP 101. The cooperation application connects to the software AP using the acquired connection information, and thereby joins the wireless network 150b provided by the software AP. Further, the cooperation application can connect to the software AP by allowing the user to input the SSID and the network key. The user can recognize the connection information to be input into a print application, by viewing the information 411 displayed on the screen in FIG. 4B.

Figure 6:
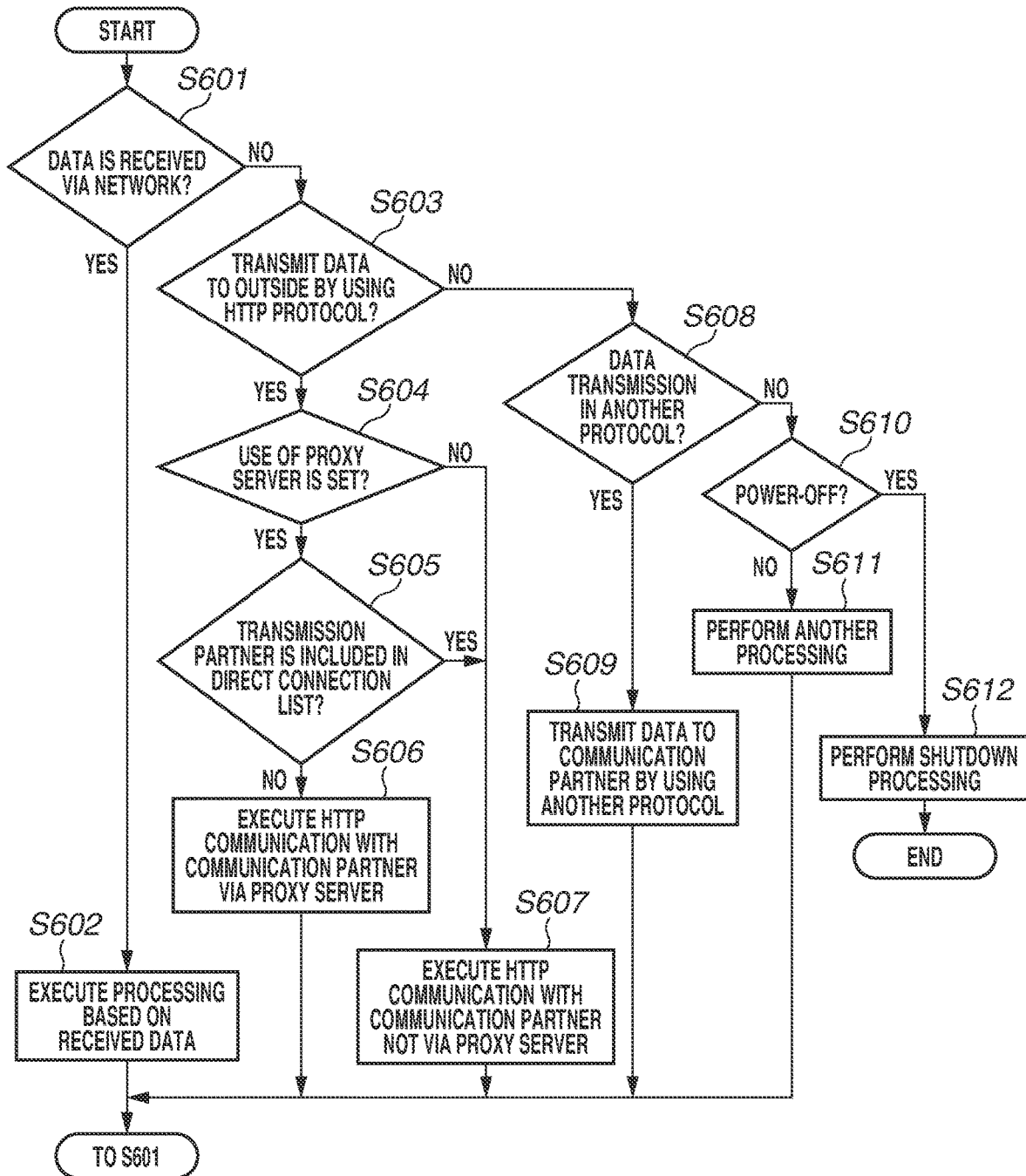
FIG. 6 is a flowchart illustrating control of the MFP.

Next, a specific method for control to perform the HTTP communication not via the proxy server, for the partner communicating in the direct wireless communication, will be described with reference to a flowchart in each of FIG. 5 and FIG. 6. The CPU 111 reads a program for implementing each control module stored in the ROM 112 or the storage 114 into the RAM 113 and executing the read program to implement each operation (step) illustrated in the flowchart in each of FIG. 5 and FIG. 6. The CPU 111 mainly executes the processing of the flowchart, but a part of the processing is implemented in collaboration with each interface, for example, the wireless LAN I/F 122.

FIG. 5 is a flowchart illustrating control for connection and disconnection of the direct wireless communication in the MFP 101 and a peripheral communication terminal. Each processing procedure illustrated in the flowchart in FIG. 5 is executed in a case where the MFP 101 operates as the software AP. For example, the processing procedure of the flowchart is executed in response to completion of the activation of the software AP upon selecting of the start key 401 illustrated in FIG. 4A by the user.

In step S501, the CPU 111 determines whether a connection request for connection to the software access point is received from a communication terminal. In a case where the connection request for connection to the software access point is received (YES in step S501), the processing proceeds to step S502. In a case where the connection request for connection to the software access point is not received (NO in step S501), the processing proceeds to step S507.

In step S502, the CPU 111 determines whether to permit the connection request received from the communication terminal. For example, in a case where authentication based on authentication information included in the connection request is successful, and the maximum number of connectable apparatuses for the direct wireless connection is not exceeded, the CPU 111 determines to permit the connection request (YES in step S502). In this case, the processing proceeds to step S503. On the other hand, in a case where the authentication based on the authentication information included in the connection request fails, or the number of apparatuses in the direct wireless connection exceeds the maximum number of connectable apparatuses for the direct wireless connection even if the authentication is successful, the CPU 111 determines that the connection request is an error (NO in step S502). In this case, the processing proceeds to step S506.

In step S503, the CPU 111 establishes wireless communication with the communication terminal that has transmitted the connection request, and assigns an IP address to this communication terminal. For example, the CPU 111 assigns an IP address, for example, 192.168.22.2/24. Upon completion of the assignment, the processing proceeds to step S504.

In step S504, the CPU 111 adds the IP address assigned in step S503 to a direct connection list for managing communication terminals in the direct wireless communication, and then the processing proceeds to step S505. The direct connection list is stored in the RAM 113 or the storage 114, and may be appropriately referred to in the processing procedure of the flowchart to be described below.

In step S505, the CPU 111 executes cooperation processing with the connected communication terminal (e.g., the communication terminal 102). Specifically, for example, the CPU 111 executes print processing in which print data is received from the communication terminal 102 via the wireless network 150b and the received print data is printed. The CPU 111 can also execute scan cooperation processing in which an original is read with the scanner 118 and data obtained by this reading is stored into the storage of the communication terminal 102. The scan cooperation processing is performed, for example, in the following procedure. First, a setting about scan is set on the cooperation application of the communication terminal. The setting about scan includes settings of the size of an original, whether to read both sides or one side of an original, and whether to scan an original placed in an auto document feeder (ADF) or an original placed on a platen glass. The setting about scan further includes specification of a file format (such as Joint Photographic Coding Experts Group (JPEG), or Portable Original Format (PDF)) for transmission. The setting about scan furthermore includes settings of a resolution, and presence/absence of optical character recognition (OCR). Subsequently, when an instruction for executing scan cooperation is provided by a user operation, the communication terminal 102 activates the WebDAV server. Further, the communication terminal 102 transmits data, which includes destination information for connection to the activated WebDAV server and the above-described setting about scan, to the MFP 101. This transmission of the data and the transmission of the print data are transmission from the communication terminal 102 to the MFP 101. Therefore, the data can be transmitted to the communication terminal 102 not via the proxy server 106.

Upon receipt of the data including the destination information and the setting about scan from the communication terminal 102, the CPU 111 obtains an image by scanning an original in collaboration with the scanner 118. In addition, the CPU 111 generates a file to be uploaded to the WebDAV server of the communication terminal 102, by performing processing, such as image processing on the obtained image and conversion to the specified file format. Upon completion of the generation of the file, the CPU 111 accesses the WebDAV server of the communication terminal 102 and uploads the generated file. In this case, the MFP 101 starts the communication to the WebDAV server of the communication terminal 102. In other words, the MFP 101 transmits a HTTP request for access to the WebDAV server. In the present embodiment, the HTTP communication is thus performed with the partner of the direct wireless connection. The communication control in this case will be described with reference to FIG. 6.

Subsequently, in step S506, the CPU 111 determines whether an instruction for ending the software access point is received. In a case where the instruction for ending the software access point is received (YES in step S506), the processing proceeds to step S509. In step S509, the CPU 111 deletes all the communication terminals added to the direct connection list from this direct connection list. In other words, initialization of the direct connection list is performed. Upon completion of the initialization of the direct connection list, the series of processes of the control for connection and disconnection of the direct wireless communication ends. On the other hand, in a case where the instruction for ending the software access point is not received (NO in step S506), the processing returns to step S501.

In step S507, the CPU 111 determines whether there is a timed-out communication terminal among the communication terminals connected to the software AP. For example, in a case where there is a communication terminal that has not performed communication for a predetermined time (e.g., ten minutes) since the establishment of the connection, the CPU 111 determines that there is a timed-out communication terminal (YES in step S507). In this case, the processing proceeds to step S508. On the other hand, in a case where there is no communication terminal that has not performed communication for the predetermined time since the establishment of the connection, the CPU 111 determines that there is no timed-out communication terminal (NO in step S507), in this case, the processing proceeds to step S505.

In step S508, the CPU 111 deletes the timed-out communication terminal from the direct connection list. In addition, if the wireless communication with the timed-out communication terminal is maintained, the CPU 111 ends the wireless connection with this communication terminal. Upon completion of the process in step S508, the processing proceeds to step S505.

By the series of processes in step S501 to step S508, a partner currently connected in the direct wireless communication is included in the direct connection list. In the present embodiment, the case where the initialization of the direct connection list is performed at the timing of step S509 is described as an example, but this is not limitative. For example, the initialization of the direct connection list can be performed as an initialization process in activating the software AP.

Next, control for network communication using this direct connection list will be described with reference to FIG. 6. Each process illustrated in the flowchart in FIG. 6 is executed upon completion of the activation following power-on of the MFP 101.

In step S601, the CPU 111 determines whether data is received via a network. In a case where data is received via a network (YES in step S601), the processing proceeds to step S602. In a case where data is not received via a network (NO in step S601), the processing proceeds to step S603.

In step S602, the CPU 111 executes processing based on the data received in step S601. For example, in a case where data including WebDAV destination information and scan setting is received, the CPU 111 performs the above-described scan processing and file generation processing. Upon completion of the file generation processing, transmission processing for a file using the HTTP protocol subsequently begins. In other words, the processing proceeds to step S603. In a case where print data is received, an image is printed on a sheet based on the received print data. Upon completion of the print processing, the processing returns to step S601.

In step S603, the CPU 111 determines whether to transmit data to outside by using the HTTP. In a case where data is to be transmitted to outside by using the HTTP (YES in step S603), the processing proceeds to step S604. In a case where data is not to be transmitted to outside by using the HTTP (NO in step S603), the processing proceeds to step S608. The communication using the HTTP can include HTTP Secure (HTTPS). Further, for example, in a case where a proxy server supports a relay of the FTP, the processing may also proceed to step S604 in a case where data is to be transmitted using the FTP.

In step S604, the CPU 111 determines whether use of a proxy server is set. In a case where the setting 305 about use of a proxy server is set to ON (YES in step S604), the processing proceeds to step S605. In a case where the setting 305 about use of a proxy server is set to OFF (NO in step S604), the processing proceeds to step S607.

In step S605, the CPU 111 determines whether the partner in the HTTP communication is included in the direct connection list. In a case where the partner in the HTTP communication is included in the direct connection list (YES in step S605), the processing proceeds to step S607. In a case where the partner in the HTTP communication is not included in the direct connection list (NO in step S605), the processing proceeds to step S606.

In step S606, the CPU 111 executes the HTTP communication with the communication partner via the proxy server. Specifically, the CPU 111 transfers a HTTP request to the proxy server (e.g., the proxy server 106) set in the setting 306 to implement the HTTP communication via the proxy server. Upon completion of the data transmission, the processing returns to step S601, and waits for occurrence of transmission/reception of data. By this processing, in a case where the MFP 101 accesses a WebDAV server or a web server on the Internet 140 via the LAN 100, the HTTP communication can be performed via the proxy server set beforehand.

On the other hand, in step S607, the CPU 111 executes the HTTP communication with the communication partner not via the proxy server. By this processing, in a case where the HTTP communication for uploading a file to the WebDAV server activated by the communication partner (e.g., the communication terminal 102) connected in the direct wireless communication is to be performed, the HTTP communication can be performed not via the proxy server. Accordingly, even if use of the proxy server is set, a file can be stored into the storage of the communication terminal 102 not via the proxy server. Upon completion of the data transmission, the processing returns to step S601 and waits for occurrence of further transmission/reception of data.

Meanwhile, in step S608, the CPU 111 determines whether to perform data transmission in another protocol. In a case where data transmission in another protocol is to be performed (YES in step S608), the processing proceeds to step S609. In a case where data transmission in another protocol is not to be performed (NO in step S608), the processing proceeds to step S610. In step S609, the CPU 111 performs the data transmission in the another protocol. In the data communication in the another protocol, the data is transmitted to a specified transmission partner, the proxy server 106. Upon completion of the data transmission, the processing returns to step S601, and waits for occurrence of transmission/reception of data.

Subsequently, in step S610, the CPU 111 determines whether an instruction for power-off is received. In a case where an instruction for power-off is received (YES in step S610), the processing proceeds to step S612. In step S612, the CPU 111 performs shutdown processing for the MFP 101 and ends the series of processes. In a case where an instruction for power-off is not received (NO in step S610), the processing proceeds to step S611.

In step S611, the CPU 111 executes another processing. For example, the CPU 111 executes processing such as processing of the copy function of printing an image obtained by reading an original on a sheet. The other processing is performed based on a user operation via the operation unit 116, or performed based on an instruction received from, for example, the cooperation application. Upon completion of the another processing, the processing returns to step S601 and waits for occurrence of further transmission/reception of data.

As described above, in the present embodiment, even if use of the proxy server is set, the HTTP communication can be performed not via the proxy server, for the partner communicating in the direct wireless communication.

<Modifications>

In the present embodiment, the case where the MFP 101 activates the software AP and performs the wireless communication via the software AP is described as an example of the direct wireless communication, but this is not limitative. For example, the direct wireless communication between the MFP and the communication terminal can be a different type of wireless communications, for example, wireless communication conforming to Wi-Fi Direct (registered trademark) standard or wireless communication conforming to Wi-Fi Aware (registered trademark) certification. As a Wi-Fi standard, Wi-Fi Direct (registered trademark) standard is single radio hop communication that may allow devices to connect together without requiring, for example, a wireless access point or a wireless router. As a Wi-Fi certification program, Wi-Fi Aware (registered trademark) may allow establishing a file transfer peer-to-peer data connection and receiving applications or services availability notifications from another compatible device or a particular access point.

Further, in the present embodiment, the case where whether the HTTP communication is performed via the proxy server is determined depending on whether the partner in the HTTP communication is included in the direct connection list in step S605 is described as an example, but this is not limitative. For example, whether the HTTP communication is performed via the proxy server may be determined depending on whether the network address of the communication partner matches with the network address of an IP address which is distributed by the software AP. In this case, in place of the process in step S605, determination may be made based on whether the network address of the partner matches with the network address of the IP address which is distributed by the software AP, and the processing may proceed to step S607 in a case where the result of this determination is positive. On the other hand, the processing may proceed to step S606, in a case where the network address of the communication partner does not match with the network address of the IP address which is distributed by the software AP.

Alternatively, whether the HTTP communication is performed via the proxy server may be determined depending on whether the IP address of the communication partner is included in the range of IP addresses to be assigned to communication terminals. In this case, in place of the process in step S605, determination may be made based on whether the IP address of the communication partner is included in the range of IP addresses to be assigned to communication terminals, and the processing may proceed to step S607 in a case where the result of this determination is positive. On the other hand, the processing may proceed to step S606, in a case where the IP address of the communication partner is not included in the range of IP addresses to be assigned to communication terminals.

Further, in the present embodiment, the HTTP, the HTTPS, and the FTP are each described as an example of the communication protocol for executing the communication via the proxy server, but this is not limitative.

The present embodiment is also applicable to a case where communication is performed using any of other types of protocol including Simple Mail Transfer Protocol (SMTP), Post Office Protocol (POP). Internet Message Access Protocol (IMAP), and telnet, in this case, the processing may proceed to step S604, also when the CPU 111 determines that data is to be transmitted to outside by using a protocol, such as the SMTP, the POP, the IMAP, or the telnet, in step S603.

As described above, according to each of the embodiments described above, even if use of the proxy server is set, the HTTP communication can be performed not via the proxy server, for the partner on the personal area network.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The compute ay include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-197251, filed Oct. 10, 2017, which is hereby incorporated by reference herein in its entirety.

What is claimed is:

1. An image processing apparatus to execute Hypertext Transfer Protocol (HTTP) communication, the image processing apparatus comprising:
at least one processor; and
at least one memory storing instructions, that, when executed by the at least one processor, cause the image processing apparatus to perform operations including:
setting as an operation setting of the image processing apparatus whether to use a proxy server that has a function of relaying HTTP communication based on a user operation, and
controlling, in a case where the HTTP communication to an external apparatus on a wireless personal area network which is provided by the image processing apparatus or the external apparatus is to be performed, to execute the HTTP communication to the external apparatus without going through the proxy server, even if the image processing apparatus is set to use the proxy server as the operation setting.

2. A method for an image processing apparatus to execute Hypertext Transfer Protocol (HTTP) communication, the method comprising:
setting as an operation setting of the image processing apparatus whether to use a proxy server that has a function of relaying HTTP communication based on a user operation; and
controlling, in a case where the HTTP communication to an external apparatus on a wireless personal area network which is provided by the image processing apparatus or the external apparatus is to be performed, to execute the HTTP communication to the external apparatus without going through the proxy server, even if the image processing apparatus is set to use the proxy server as the operation setting.

3. The method according to claim 2, further comprising determining whether a communication destination in the HTTP communication is a communication destination corresponding to an external apparatus that belongs to the wireless personal area network.

4. The method according to claim 2, wherein, in a case where the HTTP communication to the external apparatus is to be performed, controlling to execute includes controlling to execute the HTTP communication without going through the proxy server, according to the operation setting of not using the proxy server.

5. The method according to claim 2, wherein the HTTP communication to the external apparatus is communication that is performed via a wireless network conforming to Wi-Fi Direct® standard or Wi-Fi Aware® certification.

6. The method according to claim 2,
wherein the image processing apparatus includes a wireless communication interface,
wherein the wireless communication interface is able to operate as a wireless client for connection to an external access point conforming to Institute of Electrical and Electronics Engineers (IEEE) 802.11 standard, and is able to operate as a communication access point conforming to the IEEE 802.11 standard to perform direct wireless communication with the external apparatus, and
wherein the HTTP communication to the external apparatus is communication that is performed via the communication access point provided by the wireless communication interface.

7. The method according to claim 6, wherein, in a case where the HTTP communication is to be performed in wireless communication via the external access point and where the image processing apparatus is set to use the proxy server as the operation setting, controlling to execute includes controlling to execute the HTTP communication to the external apparatus via the proxy server.

8. The method to claim 2,
wherein the image processing apparatus includes wired local area network (LAN) interfaces that connect to a LAN via a network cable, and
wherein, in a case where the HTTP communication is to be performed via the wired LAN interfaces and where the image processing apparatus is set to use the proxy server as the operation setting, controlling to execute includes controlling to execute the HTTP communication to the external apparatus via the proxy server.

9. The method to claim 2, wherein the image processing apparatus is digital signage device.

10. The method according to claim 2, wherein the image processing apparatus is a multifunctional apparatus having at least a print function of receiving data and printing the received data, and a transmission function of transmitting data to the external apparatus via a network.

11. The method according to claim 10,
wherein the image processing apparatus includes a scanner, and
wherein, according to at least receipt of setting information about scan from an external terminal on the wireless personal area network, the transmission function transmits, by using the HTTP communication, data based on an image obtained by reading an original with use of the scanner to a Web-based Distributed Authoring and Versioning (WebDAV) server.

12. A non-transitory computer-readable storage medium storing a program to cause an image processing apparatus to perform a method to execute Hypertext Transfer Protocol (HTTP) communication, the method comprising:
setting as an operation setting of the image processing apparatus whether to use a proxy server that has a function of relaying HTTP communication based on a user operation; and
controlling, in a case where the HTTP communication to an external apparatus on a wireless personal area network which is provided by the image processing apparatus or the external apparatus is to be performed, to execute the HTTP communication to the external apparatus without going through the proxy server, even if the image processing apparatus is set to use the proxy server as the operation setting.

* * * * *